United States Patent
Larsson et al.

(10) Patent No.: US 8,369,261 B2
(45) Date of Patent: Feb. 5, 2013

(54) METHOD AND APPARATUS FOR INTERFERENCE REDUCTION

(75) Inventors: Peter Larsson, Solna (SE); Niklas Johansson, Sollentuna (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 384 days.

(21) Appl. No.: 12/306,550

(22) PCT Filed: Jul. 12, 2006

(86) PCT No.: PCT/SE2006/050257
§ 371 (c)(1),
(2), (4) Date: Dec. 24, 2008

(87) PCT Pub. No.: WO2008/008013
PCT Pub. Date: Jan. 17, 2008

(65) Prior Publication Data
US 2009/0231989 A1    Sep. 17, 2009

(51) Int. Cl.
*H04J 3/08* (2006.01)
(52) U.S. Cl. .................................. 370/326
(58) Field of Classification Search .......... 370/201, 370/310, 329
See application file for complete search history.

(56) References Cited

U.S. PATENT DOCUMENTS

| 6,832,073 | B2 * | 12/2004 | Jang et al. ............... 455/67.13 |
| 7,142,861 | B2 * | 11/2006 | Murai ...................... 455/444 |
| 7,317,747 | B2 * | 1/2008 | Miyazaki et al. ......... 375/136 |
| 7,656,936 | B2 * | 2/2010 | Li et al. .................... 375/148 |
| 2002/0058513 | A1 | 5/2002 | Klein et al. |
| 2002/0172217 | A1 * | 11/2002 | Kadaba et al. ............ 370/443 |
| 2006/0126536 | A1 * | 6/2006 | Patel et al. ................ 370/254 |
| 2007/0040704 | A1 * | 2/2007 | Smee et al. ............... 340/981 |
| 2008/0043879 | A1 * | 2/2008 | Gorokhov et al. ........ 375/296 |

FOREIGN PATENT DOCUMENTS

| WO | 02/082752 A2 | 10/2002 |
| WO | 2004/015878 A2 | 2/2004 |

* cited by examiner

*Primary Examiner* — Mark Rinehart
*Assistant Examiner* — Mohammad Anwar
(74) *Attorney, Agent, or Firm* — Coats & Bennett, P.L.L.C.

(57) ABSTRACT

A method and apparatus for reducing interference caused by an interfering signal are disclosed for use in an access node, such as a base station, communicating with at least one mobile terminal in a wireless network, the method comprising the following steps: receiving information related to at least one data packet that is to be transmitted by a second access node to at least a second mobile terminal, receiving time-frequency information about the point in time when the at least one data packet will be transmitted from the second access node to the second mobile terminal, estimating the interfering signal based on the at least one data packet, cancelling interference based on the estimated interference signal at the point in time. This facilitates interference cancellation, especially in a network using distributed RRM.

21 Claims, 3 Drawing Sheets

METHOD AND APPARATUS FOR INTERFERENCE REDUCTION

TECHNICAL FIELD

The present invention relates to an interference reduction device as defined in the preamble of claim 1, an access node as defined in the preamble of claim 10 and a method as defined in the preamble of claim 12.

BACKGROUND AND PRIOR ART

In wireless communication networks, uplink and downlink traffic must be duplexed in such a way that they can be separated from each other. The most common methods of doing this are Frequency Division Duplexing (FDD) and Time Division Duplexing (TDD), i.e. separating the uplink and downlink signals in frequency and time, respectively. Each of these methods has advantages and disadvantages over the other.

TDD has the advantage over FDD that required resources in the uplink and downlink can be assigned in a more flexible manner. Further filters, which are costly and potentially space-requiring, are not needed, and channel reciprocity may be exploited for channel and path gain estimations.

To exploit the resources of the wireless network as flexibly as possible, it should preferably be possible to vary the time used for uplink and downlink traffic, respectively, in order to accommodate varying traffic needs in up and downlink over time. This means that at any given time, it is possible that some cells will use uplink resources and some cells will use downlink resources. This leads to increased interference between cells, both between base stations and between mobile terminals.

In particular, the interference between base stations is a problem, since the path loss between base stations is often very low in comparison with the path loss between mobile terminals. Downlink traffic transmitted from one base station will interfere with uplink traffic received in another base station, since the former will typically have much higher power than the latter.

Traditionally, methods of avoiding such interference have involved resource allocation or scheduling.

One such method to avoid the interference between base stations is obviously to assign uplink and downlink resources in any two cells such that they never overlap. Such a solution is described in Lindström, M.: "Resource Allocation for Asymmetric Traffic in Time Division Duplexing Mode Cellular Networks" (2003, Licentiate thesis, 2003. In a system with many cells this may be difficult to achieve, since the resource assignments in the cells are interconnected. Also, the flexibility of assigning different data rates in adjacent cells depending on the needs is lost.

Another solution, disclosed in U.S. Pat. No. 6,334,057, that allows overlaps of uplink and downlink traffic in two adjacent cells, is to schedule mobile terminals that are close to a base station, instead of mobile terminals farther away, during any potential uplink-downlink overlap between any two cells.

Tardy, Grøndalen, Vezzani: "Interference in TDD based LMDS systems" IST Mobile and Wireless Communications Summit, Thessaloniki, 17-19 Jun. 2002, describes a different approach based on interference cancellation techniques. The base station that experiences interference can obtain a copy of the data transmitted by the interfering base station and use this copy to cancel interference. No concrete suggestions are given for how to achieve this in a transport efficient manner, or for a cellular system with at least partially distributed Radio Resource Management (RRM).

OBJECT OF THE INVENTION

It is an object of the invention to provide interference cancellation, especially in a system using distributed radio resource management.

SUMMARY OF THE INVENTION

This object is achieved according to the present invention by an interference reduction device for reducing interference caused by an interfering signal, in an access node, communicating with at least one mobile terminal in a wireless network, said interference reduction device being characterized in that it comprises a first receiving unit arranged to receive information related to at least data packet that is to be transmitted by a second access node to at least a second mobile terminal, a second receiving unit arranged to receive timing-frequency information about at least one point in time when the at least one data packet will be transmitted from the second access node to the second mobile terminal, an estimating unit arranged to estimate the interfering signal based on the at least one data packet, a cancelling unit arranged to cancel interference based on the estimated interference signal at the point in time.

The object is also achieved by a method of reducing interference caused by an interfering signal, in an access node, such as a base station, communicating with at least one mobile terminal in a wireless network, comprising the following steps:

receiving information related to at least one data packet that is to be transmitted by a second access node to at least a second mobile terminal, receiving timing information about the point in time when the at least one data packet will be transmitted from the second access node to the second mobile terminal, estimating the interfering signal based on the at least one data packet, cancelling interference based on the estimated interference signal at the point in time.

The access node may be any type of node providing access to mobile terminals in a wireless network, such as a base station. While this is not strictly true for a relay station, the term access node is intended in this document to cover relay stations and similar nodes as well.

Hence, the invention enables flexible use of uplink/downlink resources in TDD networks by removing a priori known interference with a focus on distributed Radio Resource Management (RRM) operation and improved transport efficiency.

The solution according to the invention takes into account the situation where each base station handles its own scheduling, modulation and coding selection and to some extent, power control. Such a situation exists in several systems today, and is likely to be more common in the future. Also, the data packets that are to be used for interference cancellation can be transmitted at an arbitrary point in time rather than exactly when they are transmitted to the mobile terminal.

The interference reduction means preferably uses format information, such as modulation and coding information when estimating the interfering signal. This format information can be obtained in different ways. In one embodiment the interference reduction device further comprises a third receiving unit for receiving format information about a signalling format used by the second base station when transmitting the at least one data packet, wherein the estimating means is arranged to estimate the interfering signal based on the at least one data packet and the format information. This information may be received from the interfering base station. Alternatively, the modulation and coding scheme used may be known in advance in the interference reduction device. It would also be possible to let the interference reduction means guess or estimate the modulation and coding scheme. The estimating unit may then be arranged to estimate the interfering signal based on the at least one data packet and format information about a predetermined format.

The estimating unit may further be arranged to estimate at least a first and a second part of the interfering signal using at least a first and a second predetermined format, respectively, and said interference reduction device is arranged to determine which of the at least first and second predetermined format provides the best interference reduction. This allows for a certain amount of trial and error when selecting the format information to be used.

In a preferred embodiment said first and second receiving means are arranged to receive said at least one data packet and/or said timing information from the second access node. This solution is preferable from a distributed RRM point of view.

Alternatively, said first and second receiving means may be arranged to receive said at least one data packet and/or said timing information from a control node in the core network.

Preferably, the cancelling means is arranged to cancel interference only when the first access node is receiving information in the uplink while the second access node is transmitting information in the downlink. This embodiment minimizes the amount of additional data that must be sent and the processing requirements for interference calculation, by only performing interference cancellation when it is really needed.

The object stated above is also achieved by an access node for use in a wireless network for connecting at least one terminal to the network, characterized in that it comprises at least one interference reduction device as defined above.

The access node may further comprise communication means arranged to transmit to another access node in the network at least one data packet that is to be transmitted to the other access node and timing information about when the at least one data packet is to be transmitted.

The invention also relates to a wireless Communication network, characterized in that it comprises at least one access node according to the above.

BRIEF DESCRIPTION OF THE DRAWINGS

The invention will be described in more detail in the following, by way of example and with reference to the appended drawings in which.

DETAILED DESCRIPTION OF EMBODIMENTS

Figure 1A:
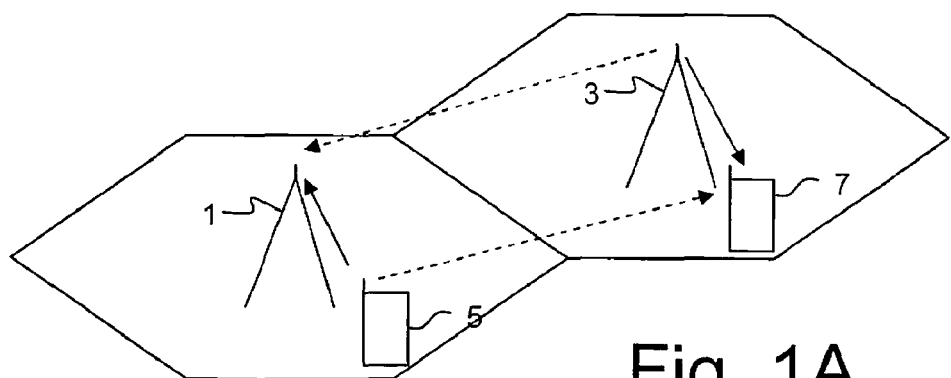
FIGS. 1A and 1B illustrate communication in a wireless network using TDD
Figure 1B:
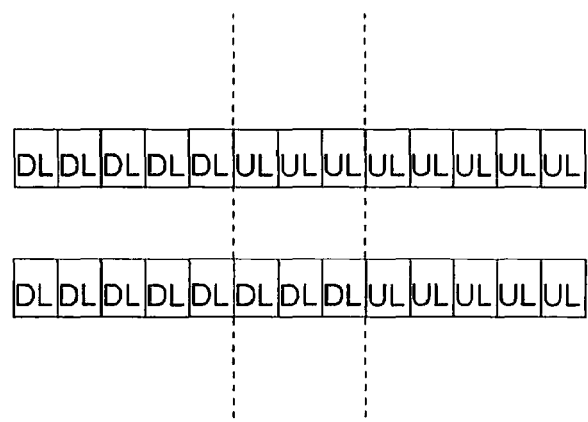

FIG. 1A illustrates, schematically, a first and a second cell of a wireless communications network. FIG. 1B illustrates, schematically, the assignment of resources in the first and the second cell respectively. Time slots in which downlink resources are used are denoted DL and time slots in which uplink resources are used are denoted UL.

In each cell there is a base station 1, 3 communicating with a mobile terminal 5, 7, respectively. As can be seen in FIG. 1B, there is a period of three time slots, between the vertical dashed lines, in which uplink resources are used in the first cell and downlink resources are used in the second cell. FIG. 1A illustrates the situation in this period, which will be referred to as an overlap period. The signals between a sender and an intended receiver are shown as solid lines and the signals between a sender and an unintended receiver, which may cause interference, are shown as dashed lines. In FIG. 1A, the first mobile terminal 5 is transmitting an uplink signal intended for the first base station 1. The second base station 3 is transmitting a downlink signal intended for the second mobile terminal 7. The downlink signal transmitted from the second base station 3 will be received as an interfering signal in the first base station with a relatively high power compared to the uplink signal received from the first mobile terminal 5. Similarly, the uplink signal transmitted from the first mobile terminal 5 will be received in the second mobile terminal 7 as an interfering signal, interfering with the downlink signal received from the second base station 3. Typically, this interference between mobile terminals is much less than the aforementioned interference between base station, due to differences in propagation characteristics. Hence interference between mobile terminals will not be further considered.

Figure 2:
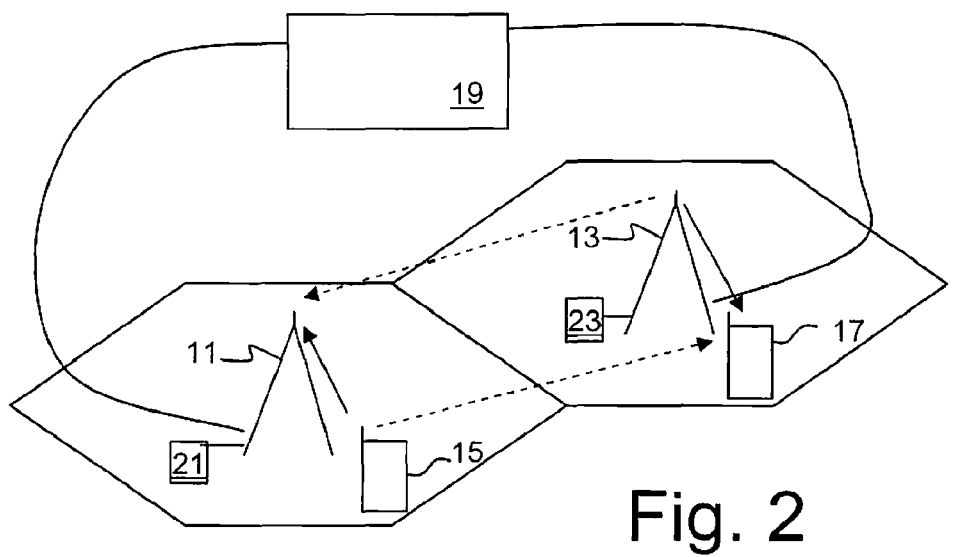
FIG. 2 illustrates a part of a wireless communications network using the inventive method for interference reduction

FIG. 2 illustrates two cells of a wireless network in which the invention has been implemented. As in FIG. 1a a first 11 and a second 13 base station serve as access nodes in a wireless network (not shown) for a first 15 and a second 17 mobile terminal, respectively. A Radio Network Controller (RNC) 19, or equivalent, controls the base stations 11, 13 as is common in the art.

Figure 3:
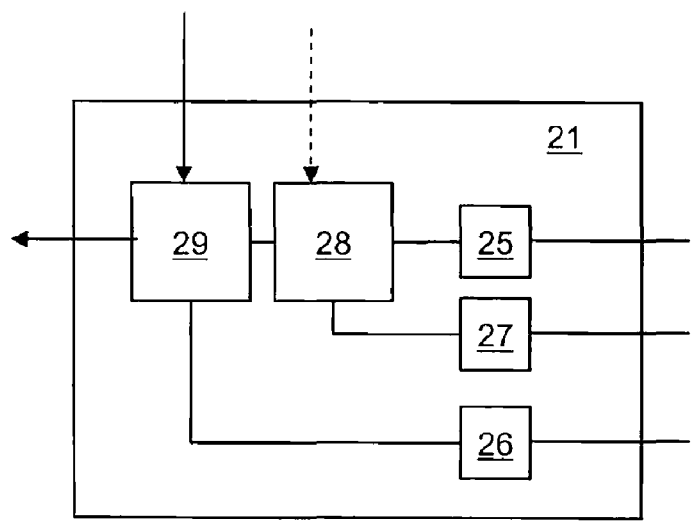
FIG. 3 illustrates an interference reduction device according to the invention

Each base station 11, 13 comprises an interference reduction device 21, 23 arranged to cancel out interference as will be discussed in the following with reference to FIG. 3, in which the interference reduction device 21 of the first base station is shown. The description is also valid for the interference reduction device 23 of the second base station.

The interference reduction device 21 comprises a first receiving unit 25 arranged to receive from the second base station 13 data packets that are to be transmitted from the second base station to one or more mobile terminals. The second base station may transmit all data packets or only the ones that may be transmitted during a time of overlap as discussed in connection with FIG. 1B. The interference reduction device 21 also comprises a second receiving unit 26 arranged to receive timing, frequency or timing-frequency information from the second base station, related to when the data packets will be transmitted, on which frequency, or a combination of both. Preferably, the interference reduction device 21 also comprises a third receiving unit 27 for receiving information about the signal format that will be used by the second base station when transmitting the data packets.

An estimating unit 28 is arranged in the interference reduction device to estimate (in the sense of reconstructing) an interference signal that will be caused in the first base station by the data transmitted from the second base station, based on the data packets received in the first receiving unit 25, and, if present, the format information received in the third receiving unit 27. If no format information is received, a predetermined format may be used in estimating the signal, or the estimating unit may try to guess what the format may be. It would be possible to let the estimating unit try different formats during the interference cancellation. The interference reduction device 21 could then determine which format gives the best result and instruct the estimating unit to select this format for further use.

A cancelling unit 29 receives the estimated signal. The cancelling unit 29 also receives the desired signal, that is, the signal intended for the base station served by the interference reduction device, which is subject to interference. The cancelling unit then uses the estimated signal to cancel, or reduce, the interference signal from the desired signal at the right time, as determined by means of the timing information received by the second receiving unit 26. Note that the format information received by the third receiving unit 27 may be forwarded to the estimating unit 28 instead of the cancelling unit 29, in which case the estimating unit 28 yields a created interference signal at the right time and frequency as input to the cancelling unit 29.

The estimated signal must be weighted (i.e. appropriately scaled in phase and amplitude) before it is used for interference reduction, in dependence of how strongly the interfering signal interferes with the desired signal. This may be done in the cancelling unit 29 on the basis of the received signal. For example, the weight factor or vectors can be selected such that a metric representative of interference reduction of the interfered signal of interest is optimized. Alternatively, the estimating unit 28 may adjust the estimated signal according to appropriate weight factors before forwarding it to the cancelling unit 29. In the latter case the estimating unit needs to receive a channel estimate signal which can be used to estimate the level of interference. This channel estimate signal is indicated in FIG. 3 as a dashed line entering the estimating unit 28. Note that the weights may be frequency dependent, or as in OFDM or OFDMA, a different weight factor is, or may be, selected for each OFDM or OFDMA subcarrier.

Of course, preferably, both base stations comprise interference reduction devices and both base stations are arranged to inform other base stations about the data that it is to transmit and also provide them with timing information and format information.

The data packets and other information transmitted from the second base station to the interference reduction device of the first base station could be transmitted through the air interface, or through the core network. Alternatively, instead of transmitting the data packets from the second base station to the interference reduction device of the first base station, the data packets could be transmitted to both base stations from the network, represented by the RNC 19. If the first base station already has the data packets, the second base station would only have to transmit information such as the sequence numbers identifying the data packets that were to be transmitted, instead of the packets themselves.

A base station may experience interference from more than one other base station. In this case the interference reduction device should be arranged to receive information about the data packets transmitted from each of the other base stations, and the format used, if applicable, so that it can perform interference cancellation for each of the interfering signals. All or some of the interfering signals may be cancelled. Of course, it is possible to perform interference cancellation in the first base station only when the first base station is receiving data in the uplink, to cancel out downlink signals transmitted from one or more of the other base stations at the same time.

Figure 4:
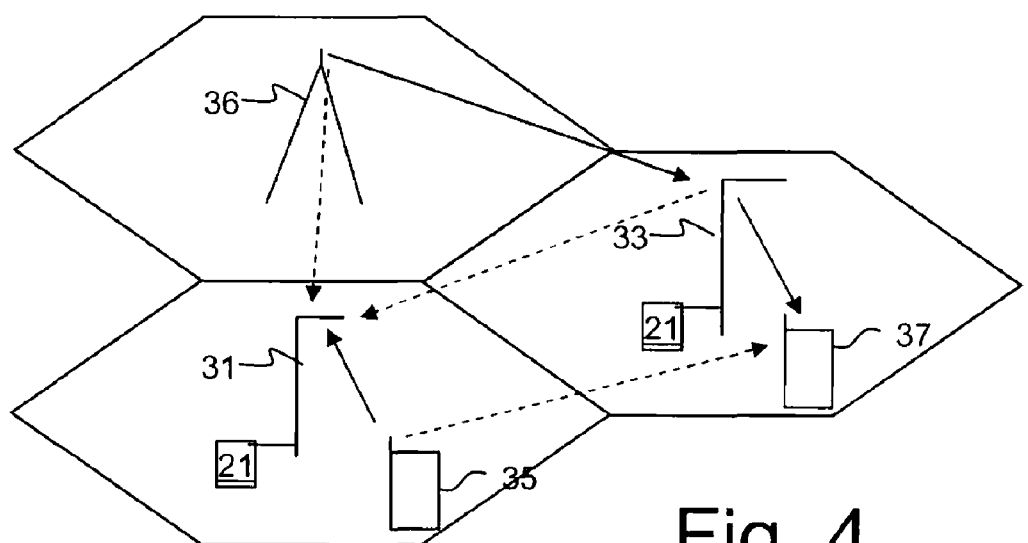
FIG. 4 illustrates use of the inventive method in a wireless communications network using relay stations.

FIG. 4 illustrates use of the inventive method in a relaying system. In this system a first 31 and a second 33 relay station communicating with a first 35 and a second 37 mobile terminal, respectively, are receiving data from a base station 36. Depending on the transmission conditions, each relay station 31, 33 potentially overhears data intended for the other relay station. For the specific example in FIG. 4 where the second relay station 33 transmits in DL it is sufficient if the first relay station 31 overhears the information sent from the base station 36 to the second relay station 33.

As in FIG. 1, the signals between a sender and an intended receiver are shown as solid lines and the signals between a sender and an unintended receiver, which may cause interference, are shown as dashed lines. In FIG. 4, the first mobile terminal 35 is transmitting an uplink signal intended for the first relay station 31. The second relay station 33 is transmitting a downlink signal intended for the second mobile terminal 37. The downlink signal transmitted from the second base station 33 will be received as an interfering signal in the first base station 31. Similarly, the uplink signal transmitted from the first mobile terminal 35 will be received in the second mobile terminal 37 as an interfering signal, but this interfering signal is normally considered to be negligible.

Each relay station 31, 33 therefore comprises an interference reduction device 21 as described in connection with FIG. 3. The function of the interference reduction device will be discussed in connection with FIG. 5. Since the first relay station 31 has previously overheard the data that are to be transmitted from the relay station 33, these data do not have to be transmitted again from the second relay station. To perform interference cancellation the first relay station 31 must have information about the format used by the second relay station 33 when transmitting downlink. Such format information may be transmitted directly from the second relay station 33 to the first relay station 31. It may also be received from the base station 36. Alternatively, the interference reduction device 21 may estimate or guess the format, as discussed in connection with FIG. 3. Hence, the interference reduction device 21 already has the data needed to generate the estimated interference signal. The timing information should still be transmitted from the second relay station to the first relay station.

Figure 5:
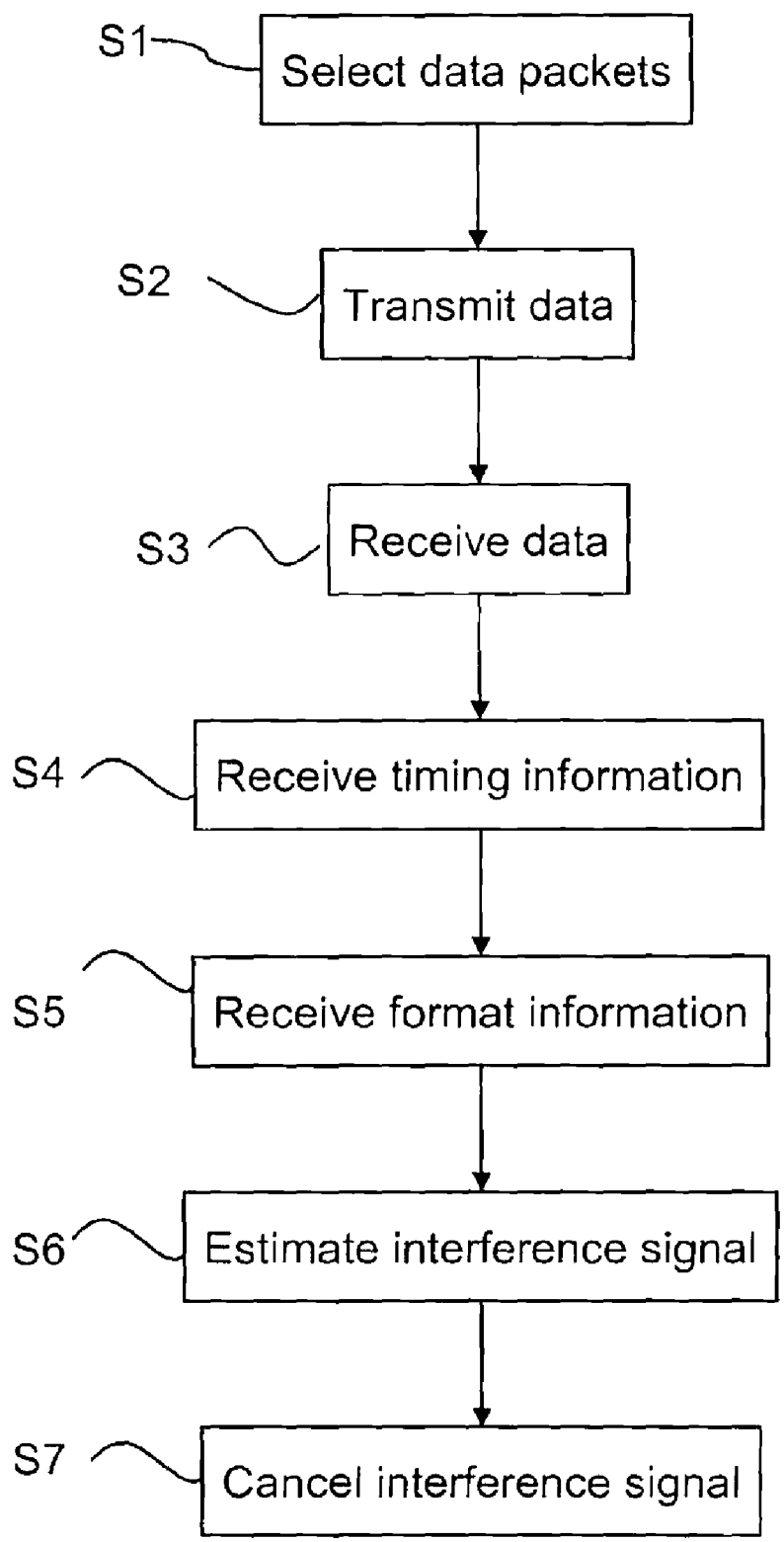
FIG. 5 illustrates a method according to one embodiment of the present invention.

The invention can be used not only between base stations, but between any kind of access nodes in a wireless network, such as relay stations. Of course, interference between a base station and a relay station, or vice versa, can be reduced in the same way using the same type of interference reduction device. In the discussion of FIG. 5, below, therefore, the term access node is used to refer to a base station or a relay station.

FIG. 5 illustrates a basic embodiment of the method according to the invention. In step S1, which is an optional step, the second access node selects the data packets that may cause interference in the first access node when they are transmitted from the second access node to the second mobile terminal.

In step S2 the selected data packets from step S1 are transmitted to the first access node. Alternatively, all data packets that will be transmitted from the second access node in a certain period of time are transmitted to the first access node. Also, timing information is transmitted, indicating when the packets will be transmitted from the second access node to the second mobile terminal. Also if different information is sent concurrently on different frequencies, as in OFDMA, this information is forwarded with the timing information. Format information indicating, for example, the modulation and coding scheme that will be used may also be included.

In step S3 the data transmitted in step S2 are received in the interference reduction device of the first access node. As mentioned above, instead of the actual data packets themselves, the identity of the data packets may be transmitted, if the first access node has already received the actual data packets.

In step S4 the timing information is received in the interference reduction device of the first access node. (If needed, as in OFDMA, the resource allocation in the frequency domain is received)

In step S5 the format information (if included) is received in the interference reduction device of the first access node.

In step S6 the estimating unit of the interference reduction device uses the information received to estimate the interference signal that will be caused by the packets when they are transmitted from the second access node to the second mobile terminal.

In step S7 the estimated interference signal is used to cancel, or reduce, the interference signal at the time when the packets are actually transmitted from the second access node to the second mobile terminal.

The invention claimed is:

1. An interference reduction device for reducing interference in a received signal, caused by an interfering signal, at a first access node communicating with one or more mobile terminals in a wireless communications network, the interference reduction device comprising:
   a first receiving unit to receive information associated with one or more data packets that are to be transmitted by a second access node to a mobile terminal;
   a second receiving unit to receive timing-frequency information identifying a time when the second access node will transmit the one or more data packets to the mobile terminal;
   an estimating unit to estimate an interfering signal based on the one or more data packets; and
   a cancelling unit to cancel interference based on the estimated interfering signal at the identified time.

2. The interference reduction device of claim 1 further comprising a third receiving unit to receive format information identifying a signaling format used by the second access node when transmitting the one or more data packets to the mobile terminal, and wherein the estimating unit estimates the interfering signal based on the one or more data packet and the received format information.

3. The interference reduction device of claim 2 wherein the third receiving unit receives the format information from a control node in the network.

4. The interference reduction device of claim 1 wherein the estimating unit estimates the interfering signal based on the one or more data packets and on format information associated with a predetermined signaling format.

5. The interference reduction device of claim 1 wherein the estimating unit estimates at least a first and a second part of the interfering signal using at least first and second predetermined signaling formats, respectively, and wherein the interference reduction device determines which of the first and second predetermined formats optimizes a metric indicative of interference reduction.

6. The interference reduction device of claim 1 wherein the estimating unit receives a channel estimate signal and adjusts the estimated interfering signal based on a level of interference determined from the channel estimate signal.

7. The interference reduction device of claim 1 wherein the cancelling unit adjusts the estimated interfering signal depending on a level of interference as determined from the received signal.

8. The interference reduction device of claim 1 wherein the first and second receiving units receive at least one of the data packet information, and the timing-frequency information, from the second access node.

9. The interference reduction device of claim 1 wherein the first and second receiving units receive at least one of the data packet information, and the timing-frequency information, from a control node in the network.

10. The interference reduction device of claim 1 wherein the cancelling unit cancels interference only when the first access node is receiving information over a uplink while the second access node is transmitting information over a downlink.

11. An access node in a communications network for connecting at least one mobile terminal to the network, the access node comprising:
   at least one interference reduction device comprising:
      a first receiving unit to receive information associated with one or more data packets that are to be transmitted by a second access node in the communications network to a mobile terminal;
      a second receiving unit to receive timing-frequency information identifying a time when the second access node will transmit the one or more data packets to the mobile terminal;
      an estimating unit to estimate an interfering signal based on the data packets; and
      a cancelling unit to cancel interference based on the estimated interfering signal at the identified time.

12. The access node of claim 11 further comprising a communication interface to:
   send the one or more data packets that the access node will transmit to a mobile terminal to another access node in the communications network; and
   send timing information to the other access node identifying when the access node will transmit the one or more data packets.

13. A method of reducing interference caused by an interfering signal at a first access node communicating with at least one mobile terminal in a wireless network, the method comprising:
   receiving information associated with one or more data packets that are to be transmitted by a second access node to a mobile terminal;
   receiving timing information indicating a time when the second access node will transmit the data packets to the mobile terminal;
   estimating the interfering signal based on the one or more data packets; and
   cancelling interference based on the estimated interference signal at the indicated time.

14. The method of claim 13 further comprising receiving format information identifying a signaling format to be used by the second access node when transmitting the one or more data packets, and wherein the interfering signal is estimated based on the one or more data packets and the received format information.

15. The method of claim 13 wherein the interfering signal is estimated based on the one or more data packets, and on format information associated with a predetermined signaling format.

16. The method of claim 13 further comprising adjusting a level of the estimated interference signal to the level of interference of a received signal before using the interfering signal to cancel interference.

17. The method of claim 13 further comprising:
estimating at least a first part and a second part of the interfering signal using at least a first and a second predetermined format, respectively; and
determining which of the first and second predetermined formats optimizes a metric indicative of interference reduction.

18. The method of claim 13 wherein at least one of the data packet information, the timing information, and format information identifying a signaling format to be used by the second access node when transmitting the data packets, are received from the second access node.

19. The method of claim 13 wherein at least one of the data packet information, the timing information, and format information identifying a signaling format to be used by the second access node when transmitting the data packets, are received from a control node in a core network.

20. The method of claim 13 wherein cancelling interference is performed only when the first access node is receiving information over the uplink while the second access node is transmitting information over the downlink.

21. A wireless communication network having a plurality of access nodes, the network comprising:
a first access node comprising an interference reduction device, the interference reduction device comprising:
a first receiving unit to receive information associated with one or more data packets that are to be transmitted by a second access node in the communications network to a mobile terminal;
a second receiving unit to receive timing-frequency information identifying a time when the second access node will transmit the one or more data packets to the mobile terminal;
an estimating unit to estimate an interfering signal based on the data packets; and
a cancelling unit to cancel interference based on the estimated interfering signal at the identified time.

* * * * *

UNITED STATES PATENT AND TRADEMARK OFFICE
CERTIFICATE OF CORRECTION

PATENT NO.         : 8,369,261 B2
APPLICATION NO.    : 12/306550
DATED              : February 5, 2013
INVENTOR(S)        : Larsson et al.

Page 1 of 1

It is certified that error appears in the above-identified patent and that said Letters Patent is hereby corrected as shown below:

In the Specification

In Column 3, Line 43, delete "Communication" and insert -- communication --, therefor.

In Column 3, Line 53, delete "TDD" and insert -- TDD. --, therefor.

In Column 3, Lines 55-56, delete "reduction" and insert -- reduction. --, therefor.

In Column 3, Line 58, delete "invention" and insert -- invention. --, therefor.

In Column 7, Line 7, delete "received)" and insert -- received). --, therefor.

In the Claim

In Column 8, Line 11, in Claim 10, delete "a uplink" and insert -- an uplink --, therefor.

Signed and Sealed this
Seventh Day of January, 2014

Margaret A. Focarino
*Commissioner for Patents of the United States Patent and Trademark Office*